(12) United States Patent
Fecteau

(10) Patent No.: US 8,037,961 B2
(45) Date of Patent: Oct. 18, 2011

(54) SNOWMOBILE FRONT SUSPENSION

(75) Inventor: Berthold Fecteau, Richmond (CA)

(73) Assignee: Bombardier Recreational Products Inc., Valcourt (CA)

( * ) Notice: Subject to any disclaimer, the term of this patent is extended or adjusted under 35 U.S.C. 154(b) by 1014 days.

(21) Appl. No.: 11/626,637

(22) Filed: Jan. 24, 2007

(65) Prior Publication Data

US 2008/0173491 A1 Jul. 24, 2008

(51) Int. Cl.
*B62M 29/00* (2006.01)

(52) U.S. Cl. ......... 180/190; 180/182; 280/601; 280/602

(58) Field of Classification Search .................. 180/190, 180/182, 187; 280/601, 602
See application file for complete search history.

(56) References Cited

U.S. PATENT DOCUMENTS

| | | | | |
|---|---|---|---|---|
| 3,884,314 A | * | 5/1975 | Callaway | 180/9.54 |
| 4,460,197 A | * | 7/1984 | Rogers | 280/86.758 |
| 4,509,766 A | * | 4/1985 | Yasui et al. | 280/21.1 |
| 4,925,207 A | * | 5/1990 | Haraguchi | 280/124.138 |
| 5,029,664 A | * | 7/1991 | Zulawski | 180/190 |
| 5,038,882 A | * | 8/1991 | Zulawski | 180/190 |
| 5,054,798 A | * | 10/1991 | Zulawski | 280/16 |
| 5,285,742 A | * | 2/1994 | Anderson | 114/43 |
| 5,498,018 A | * | 3/1996 | Wahl et al. | 280/124.146 |
| 5,499,839 A | * | 3/1996 | Wahl et al. | 280/124.145 |
| 6,009,966 A | * | 1/2000 | Olson et al. | 180/182 |
| 6,655,487 B2 | * | 12/2003 | Mallette et al. | 180/190 |
| 6,942,050 B1 | * | 9/2005 | Honkala et al. | 180/182 |
| 7,290,774 B2 | * | 11/2007 | Despres | 280/28 |
| 7,422,083 B2 | * | 9/2008 | Yoshihara et al. | 180/182 |
| 7,497,530 B2 | * | 3/2009 | Bessette | 305/135 |
| 2001/0033067 A1 | * | 10/2001 | Vangsgard | 280/400 |
| 2002/0017765 A1 | * | 2/2002 | Mallette et al. | 280/28 |
| 2002/0053477 A1 | * | 5/2002 | Karpik | 180/182 |
| 2004/0099458 A1 | * | 5/2004 | Meunier et al. | 180/190 |
| 2004/0173397 A1 | * | 9/2004 | Haruna | 180/186 |
| 2006/0032686 A1 | * | 2/2006 | Berg | 180/190 |

* cited by examiner

*Primary Examiner* — Kevin Hurley
*Assistant Examiner* — Maurice Williams
(74) *Attorney, Agent, or Firm* — Osler, Hoskin & Harcourt LLP

(57) ABSTRACT

A snowmobile having a double A-arm front suspension is disclosed. The double A-arm front suspension includes an upper A-arm, a lower A-arm, and a spindle connecting the skis the upper A-arms and lower A-arms, the connection of the upper and lower A-arms to the spindle defines a caster angle, the upper A-arm and the lower A-arm are connected to the front portion of the frame such that the caster angle decreases when the front suspension is compressed. Also disclosed is a snowmobile having a suspension travel of at least 8 inches and a steering assembly having a single pitman arm.

21 Claims, 9 Drawing Sheets

SNOWMOBILE FRONT SUSPENSION

FIELD OF THE INVENTION

The present invention relates generally to a snowmobile front suspension and in particular to the geometry of a snowmobile front suspension.

BACKGROUND OF THE INVENTION

Some conventional snowmobiles are equipped with a front suspension system utilizing trailing arms. A trailing arm front suspension system consists of two radius rods and two trailing arms connecting the ski legs to the snowmobile frame. The two radius rods extend substantially perpendicular to the longitudinal axis of the snowmobile while the trailing arms extend rearwardly substantially parallel to the longitudinal axis of the snowmobile. The front end of the trailing arm is connected to the ski leg, and the rear end of the trailing arm is pivotally connected to the snowmobile frame. In operation, the vertical movement of the ski leg follows the arc defined by the trailing arm. A trailing arm suspension geometry generates a forward motion of the skis when the suspension is compressed such that the skis have to slide forward for the suspension to be compressed. Because the skis move forward when absorbing shocks or landing from a jump, they work in the opposite direction of energy absorption. Therefore more stress is added on the front suspension components and on the frame of the snowmobile when the suspension is compressed. Furthermore, the impact forces felt by the driver of the snowmobile is greater. The trailing arm suspension geometry thus requires heavy springs, reinforced suspension arms and a reinforced frame to handle these extreme conditions thereby increasing weight and cost of the snowmobile. A trailing arm suspension geometry also generates an increase in caster angle such that more effort is required by the driver to turn the skis of the snowmobile when the suspension is compressed.

Other conventional snowmobiles are equipped with a front suspension having a double A-arm suspension geometry, also known as double wishbone suspension geometry. These types of systems have proven to be better able to handle extreme riding conditions and eliminated some of the major drawbacks of the previous described trailing arm suspension geometry because the skis do not necessarily move forward when the front suspension is compressed. However, conventional double A-arm suspension geometry still require more efforts from the driver to turn the skis of the snowmobile when the suspension is compressed.

Thus, there is a need for a snowmobile front suspension that alleviates some of the drawbacks of conventional front suspension systems and preferably reduces the steering effort required when the suspension is compressed.

STATEMENT OF THE INVENTION

One aspect of the present invention is to provide a snowmobile comprising a frame having a front portion and a rear portion; a drive track disposed below and supporting the rear portion of the frame; an engine mounted on the frame; a drive train operatively interconnecting the engine with the drive track for delivering propulsive power to the drive track; a front suspension having a left side and a right side, each side of the front suspension having an upper A-arm, a lower A-arm, and a spindle, connecting points of the upper A-arm and lower A-arm to the spindle defining a caster angle with respect to vertical, the upper A-arm and the lower A-arm being connected to the front portion of the frame such that the caster angle decreases when the front suspension is compressed; two skis connected to the front suspension system, one ski being connected to each spindle; and a steering assembly mounted on the frame and operatively connected to each spindle via steering rods for steering the skis.

In another aspect, the connection of the upper A-arm to the front portion of the frame defines an upper A-arm swing axis and the connection of the lower A-arm to the front portion of the frame defines a lower A-arm swing axis, the upper A-arm swing axis being non-parallel to the lower A-arm swing axis and crossing with the lower A-arm swing axis in front of the spindle.

In a further aspect, the upper A-arm swing axes of each side of the front suspension are non-parallel to each other and cross each other at the front of the snowmobile.

In an additional aspect, the lower A-arm is longer than the upper A-arm.

In a further aspect, the steering assembly includes a steering column having a pitman arm connected directly to each spindle via the steering rods.

In another aspect of the invention, the caster angle has a variation ranging from 3° to 7°. The caster angle varies from 16° to 25° relative to the vertical.

In an additional aspect, the length of the steering rods are at most equal to the length of the lower A-arm and longer than the length of the upper A-arm.

Another aspect of the present invention is to provide a snowmobile comprising: a frame having a front portion and a rear portion; a drive track disposed below and supporting the rear portion of the frame; an engine mounted on the frame; a drive train operatively interconnecting the engine with the drive track for delivering propulsive power to the drive track; a double A-arm front suspension having a left side and a right side, each side of the front suspension having an upper A-arm, a lower A-arm, and two skis connected to the double A-arm front suspension system, one ski to each left side and right side. Each A-arm has: a proximal end and a distal end, the distal ends defining arc radii during movement of the suspension, the arc radius of the lower A-arm being greater than the arc radius of the upper A-arm; a steering rod having a distal end and a proximal end; and a spindle pivotally connecting the ski to the distal ends of the upper A-arm and to the lower A-arm, the spindle being pivotally connected to the steering rod at the distal end thereof such that during movement of the suspension, the distal end of the steering rod follows an arc radius having a center positioned generally about a longitudinal and vertically extending centerplane of the snowmobile.

In an additional aspect, the snowmobile further comprises a steering column having a pitman arm at its lower end, the distal end of the steering rod being pivotally connected to the spindle and the proximal end of the steering rod being pivotally connected directly to the pitman arm.

In a further aspect, the arc radius of the steering rod is greater than the arc radius of the upper A-arm, and is equal to or less than the arc radius of the lower A-arm.

In a further aspect, the connections of the upper A-arm and lower A-arm to the spindle define a steering axis, the upper A-arm and the lower A-arm of the front suspension are connected to the front portion of the frame such that a caster angle of the steering axis decreases when the front suspension is compressed. The caster angle being measured with respect to vertical.

In another aspect, the connection of the upper A-arm to the front portion of the frame defines an upper A-arm swing axis and the connection of the lower A-arm to the front portion of the frame defines a lower A-arm swing axis, the upper A-arm swing axis being non-parallel to the lower A-arm swing axis and crossing with the lower A-arm swing axis at the front of the snowmobile.

In another aspect, the upper A-arm swing axis of the left and right sides of the front suspension are non-parallel to each other and cross each other at the front of the snowmobile.

In another aspect the steering rods are connected directly to the pitman arm via ball joints and the lower A-arms and steering rods are substantially parallel to each other.

Another aspect of the present invention is to provide a snowmobile comprising: a frame having a front portion and a rear portion; a drive track disposed below and supporting the rear portion of the frame; an engine mounted on the frame; a drive train operatively interconnecting the engine with the drive track for delivering propulsive power to the drive track; and a front suspension having a left side and a right side, each side of the front suspension having an upper A-arm, a lower A-arm, and a spindle, connecting points of the upper A-arm and lower A-arm to the spindle defining a steering axis, the steering axis defining a positive caster angle with respect to vertical; wherein the suspension has an uncompressed state and a compressed state and the caster angle in the compressed state is smaller than the caster angle in the uncompressed state.

For purposes of this application, terms used to locate elements on the vehicle, such as "front", "back", "rear", "left", "right", "up", "down", "above", and "below", are as they would normally be understood by a rider of the vehicle sitting on the vehicle in a forwardly facing, driving position. The term "longitudinal" means extending from the front to the back.

Caster angle is defined as the angle between the steering axis and the vertical plane viewed from the side of the vehicle.

Embodiments of the present invention each have at least one of the above-mentioned aspects, but not necessarily have all of them.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
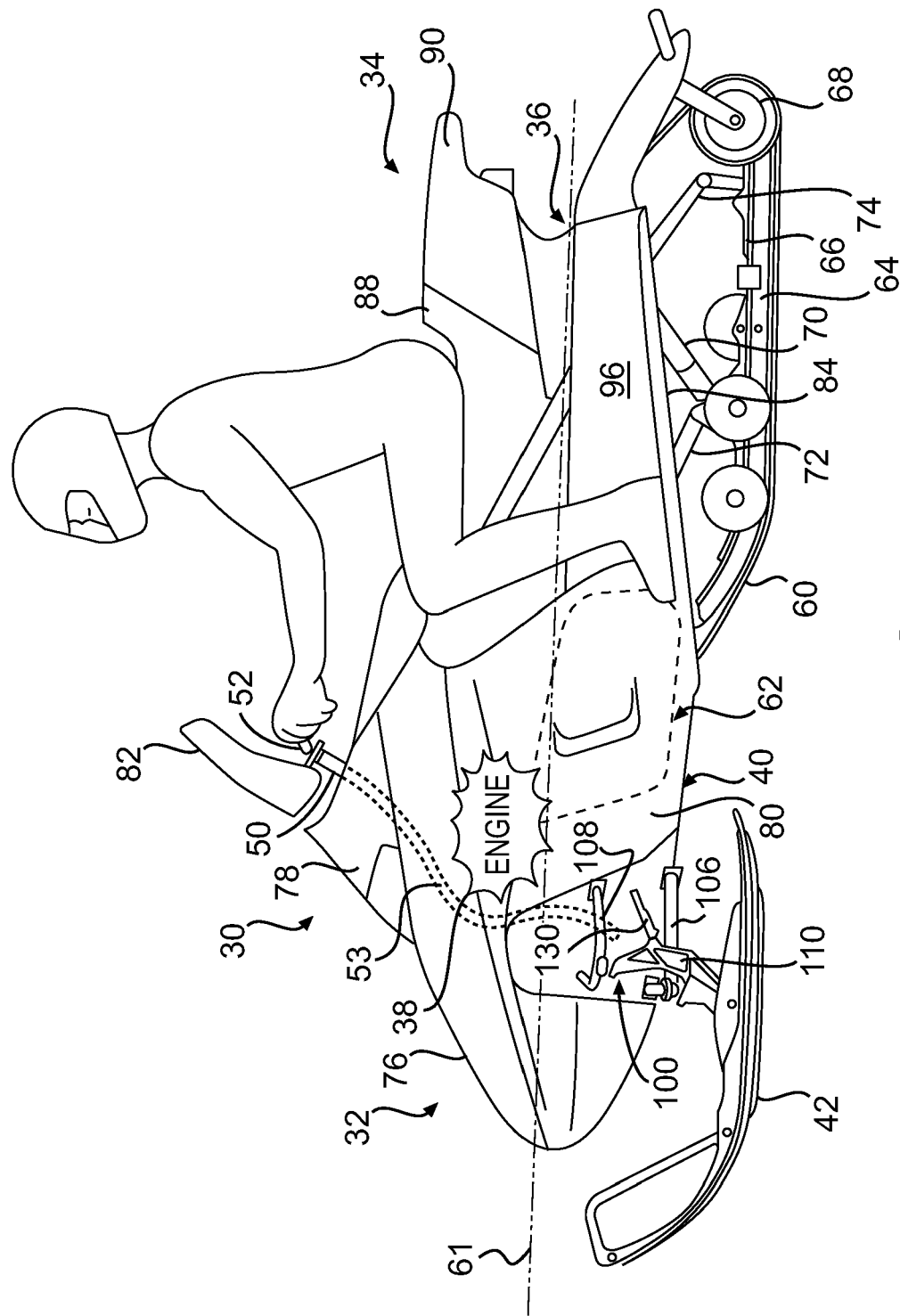
FIG. 1 is a side elevational view of a snowmobile having a front suspension and steering assembly in accordance with one embodiment of the invention.

FIG. 1 illustrates a snowmobile 30 in accordance with one specific embodiment of the invention. The snowmobile 30 includes a forward end 32 and a rearward end 34 which are defined consistently with a travel direction of the vehicle. The snowmobile 30 includes a frame 36 comprising an engine cradle portion 40 and a tunnel 96. Tunnel 96 generally consists of an inverted U-shaped bent sheet metal connected to the engine cradle portion 40 which extends rearwardly along the longitudinal axis of the snowmobile 30. While hidden behind a front fairing 54, an engine 38, schematically illustrated, provides motive force for the snowmobile 30 and is carried by the engine cradle portion 40 of the frame 36.

Two front skis 42 are attached to the front portion of the frame 36 through a front suspension system 100 in accordance with one embodiment of the invention. The front suspension system 100 generally comprises a double A-arm type suspension, having upper A-arms 108 and lower A-arms 106 on either side of the vehicle linking spindles 110 to the frame 36. The spindles 110 are attached to the skis 42 at their lower ends and rotate left and right therewith. The spindles 110 are also connected to a steering column 50 via steering rods 130. The steering column 50 is attached at its upper end to a steering device such as a handlebar 52 which is positioned forward of a rider and slightly behind the engine 38 to rotate the skis 42, thereby providing directional control of the snowmobile 30. As illustrated in dotted lines, the steering column 50 passes in front of the engine 38. The steering column 50 is designed with a bend 53 (best shown in FIG. 5) such that the steering column 50 passes in front and above the engine 38 and clears the engine 38 throughout the range of rotation of the steering column 50 when the handlebar 52 is turned to the right or to the left. Thus, by turning the steering device 52, the steering column 50 rotates, the spindles 110 are pivoted, and the skis 42 are turned to steer the snowmobile 30 in a desired direction.

An endless drive track 60, which provides propulsion to the snowmobile 30, is disposed under the tunnel 96 of the frame 36 with the upper portion of the drive track 60 accommodated within the tunnel 96. The endless drive track 60 is operatively connected to the engine 38 through a belt transmission system 62 which is schematically illustrated by broken lines. The drive train of the snowmobile 30 includes all the components of the snowmobile 30 whose function is to transmit power from the engine to the ground. The endless drive track 60 is mounted to the tunnel 96 via a rear suspension assembly 64. The rear suspension assembly 64 includes rear suspension arms 72 and 74, a pair of slide rails 66 which generally position and guide the endless drive track 60 and idler wheels 68 engaged therewith. Rear suspension arms 72 and 74 connect the slide rails 66 and idler wheels 68 to the tunnel 96 of the frame 36. The slide rails 66 typically include a sliding lower surface made of polyethylene to reduce contact friction between the slide rails 66 and the drive track 60. The rear suspension assembly 64 also includes one or more shock absorbers 70 which may further include a coil spring (not shown) surrounding the individual shock absorbers 70.

At the front end 32, the snowmobile 30 includes an external shell consisting of fairings 76 that enclose and protect the engine 38 and transmission 62 and that can be decorated to render the snowmobile 30 more aesthetically pleasing. Typically, the fairings 76 include a hood 78 and one or more side panels 80 which can be opened to allow access to the engine 38 and the transmission 62 when this is required, for example, for inspection or maintenance. The side panels 80 can be opened away from the snowmobile 30 along a vertical axis, independently from the hood 78, which pivots forward about a horizontally extending axis. A windshield 82, which may be connected either to the fairings 76 or directly to the handlebars 52, acts as wind deflector to lessen the force of the air on the rider when the snowmobile is moving.

A straddle-type seat 88 is positioned atop and mounted to the tunnel 96. At the rear of the straddle seat 88, a storage compartment 90 is provided. A passenger seat (not shown) can also be provided instead of the storage compartment 90. Two footrests 84, generally extending outwardly from the tunnel 96, are also positioned on either side of the straddle seat 88 to accommodate the rider's feet and provide a rigid platform for the rider to stand on when maneuvering the snowmobile 30.

Figure 2:
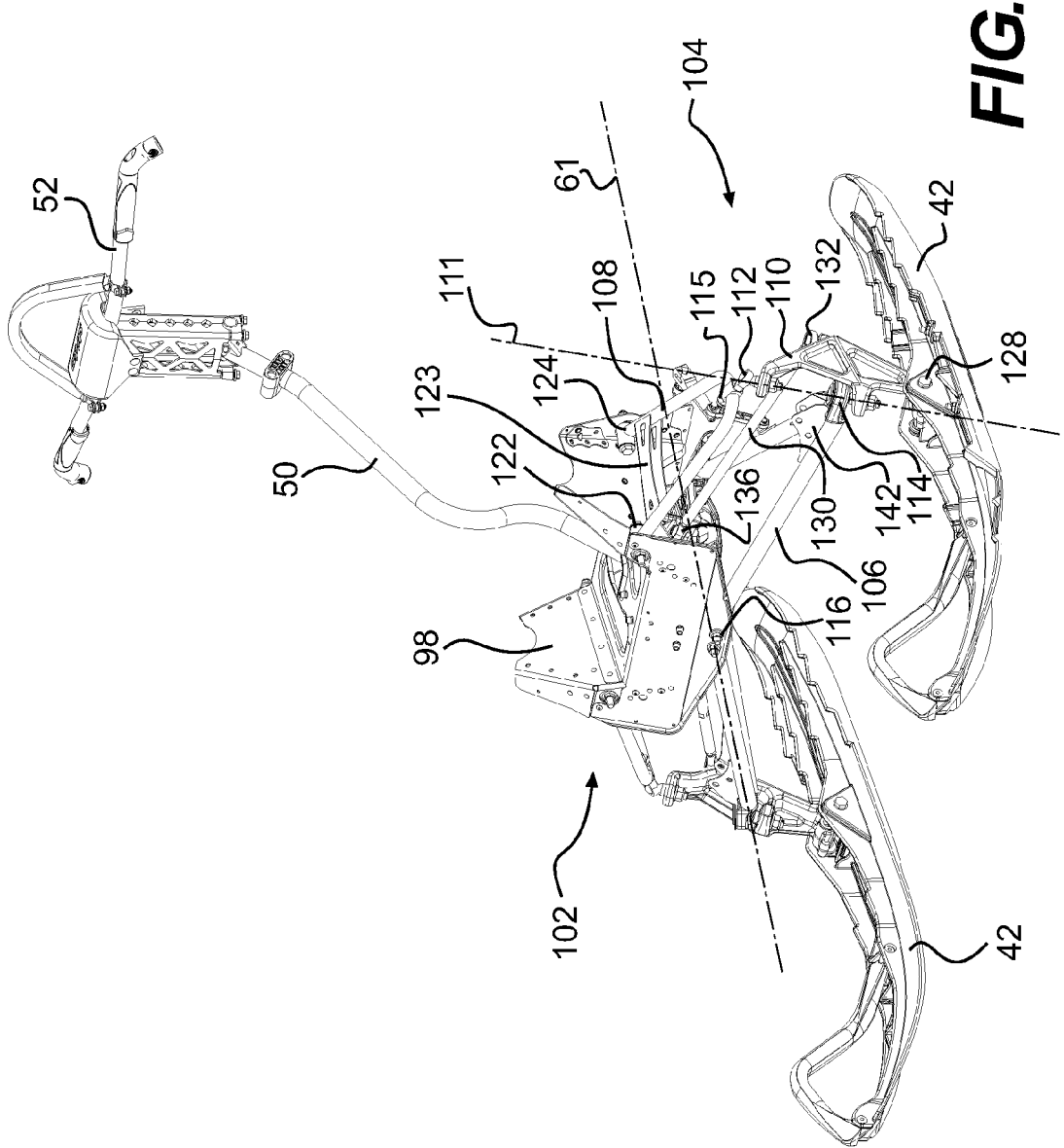
FIG. 2 is a front left perspective view of the front suspension and steering assembly of the snowmobile shown in FIG. 1 with ancillary components removed for clarity.

With reference to FIG. 2, there is shown the front suspension assembly 100 and the steering assembly of the snowmobile 30 mounted to the front portion 98 of frame 36 with all other components of the snowmobile removed for ease of reference and clarity. The front suspension assembly 100 includes a right side double A-arm assembly 102 and a left side double A-arm assembly 104. Since the right side and the left side double A-arm assemblies 102 and 104 are mirror images of each other, same reference numbers will be used for the components of the right and left double A-arm assemblies 102 and 104 with the understanding that both sides of the front suspension assembly 100 include similar components and operate in a similar fashion.

Figure 3:
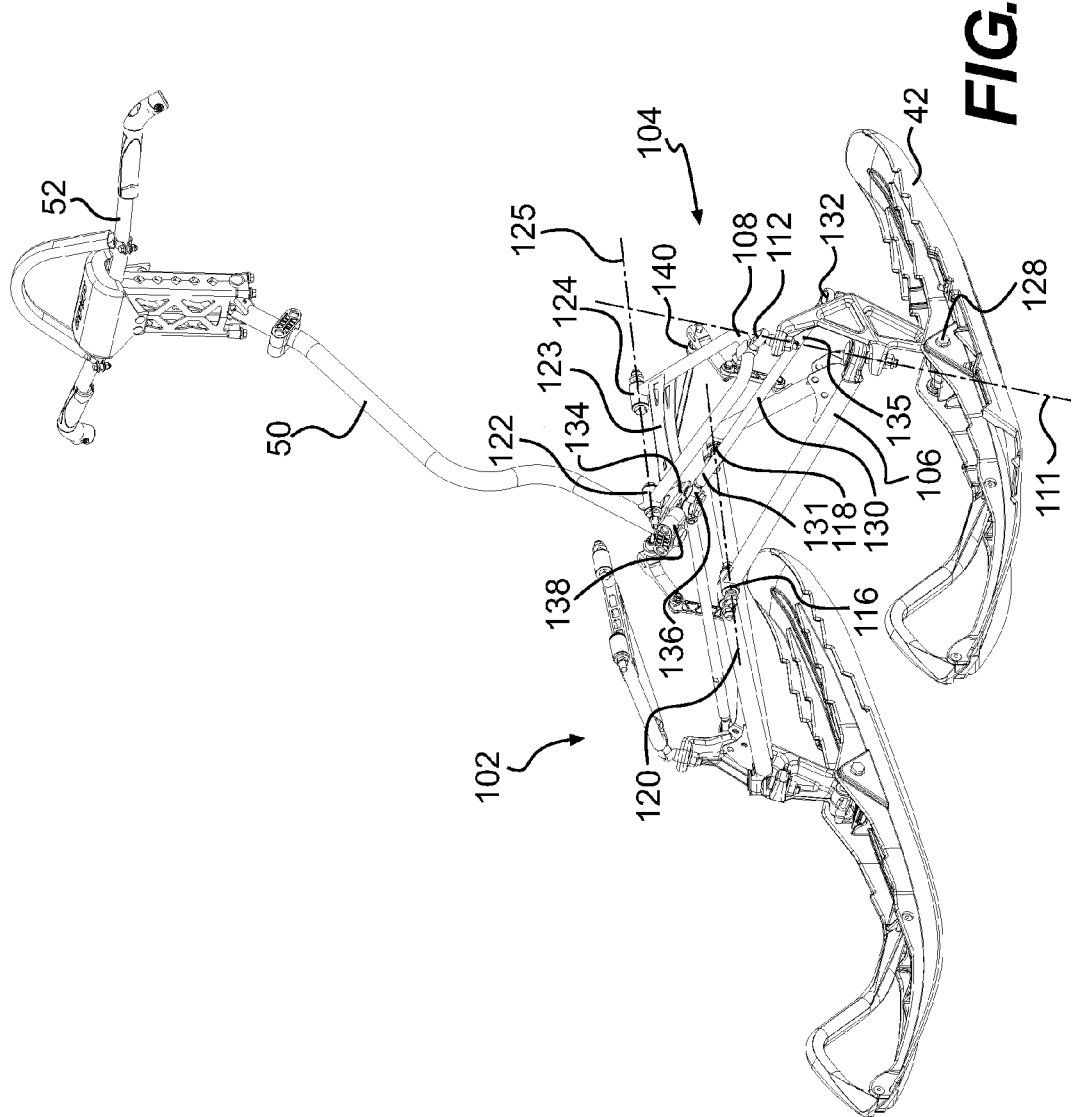
FIG. 3 is a front left perspective view of the front suspension and steering assembly shown in FIG. 2 with the front portion of the frame of the snowmobile removed.
Figure 4:
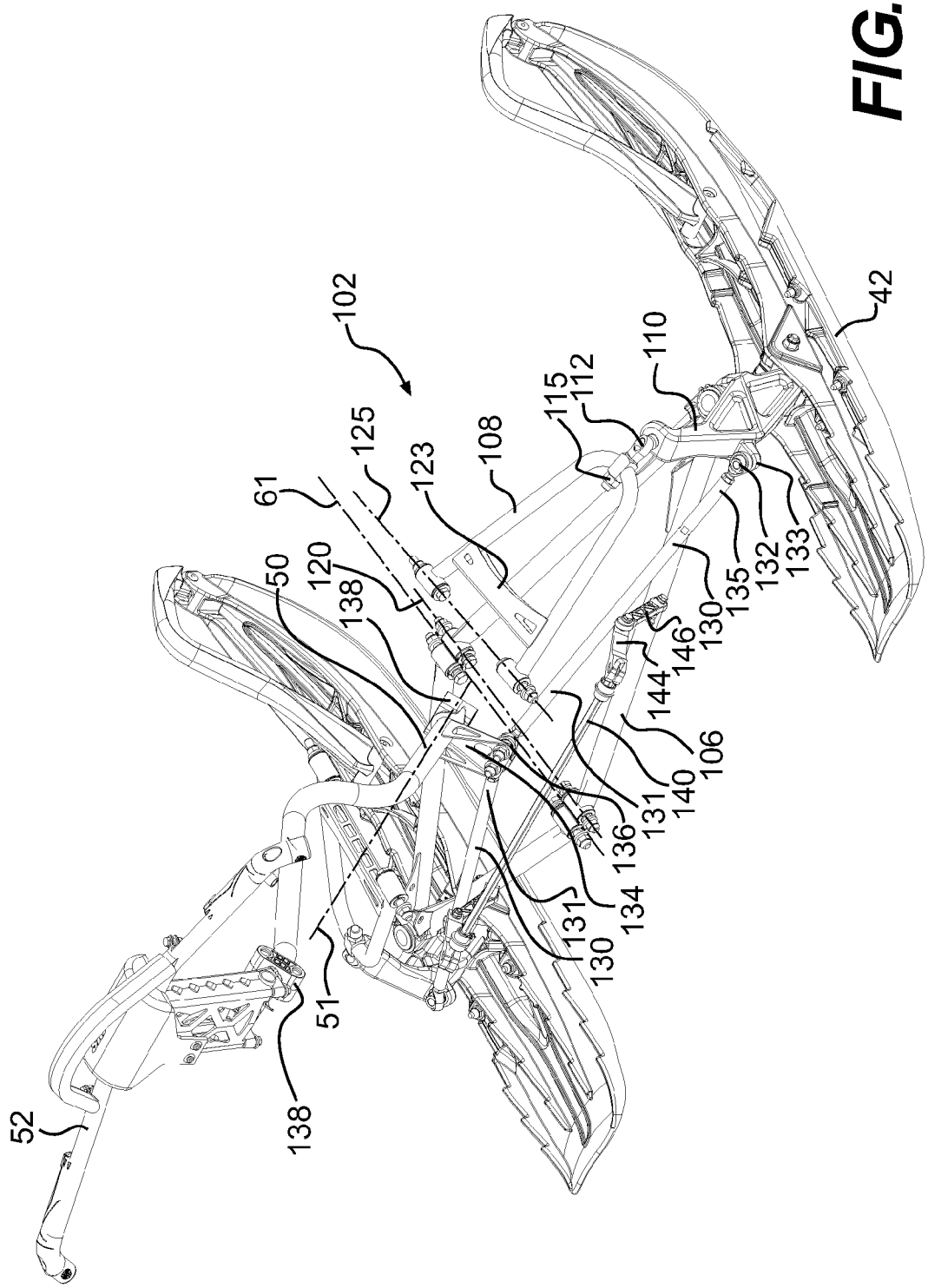
FIG. 4 is a rear right perspective view of the front suspension and steering assembly shown in FIG. 3.

The left side double A-arm assembly 104 includes a lower A-arm 106 and an upper A-arm 108. The distal end of upper A-arm 108 is connected to the upper portion of the spindle 110 via an upper ball joint 112 and the distal end of the lower A-arm 106 is connected to the middle portion of the same spindle 110 via a second ball joint 114. The ball joints 112 and 114 allow for rotational movement of the spindle 110 relative to the upper and lower A-arms 106, 108 about multiple axes such that the spindle 110 can rotate about a steering axis 111 passing through ball joints 112 and 114 and can move up and down throughout the range of steering angle. The ball joint 112 is connected to the distal end of the upper A-arm 106 via an adjustment screw 115 to allow adjustment of the kingpin angle (i.e. the angle between the steering axis and the vehicle longitudinal plane when viewed from the front of the snowmobile). The proximal ends of the lower A-arm 106 are rotatably connected to the lower portion of the front portion 98 of frame 36, very near the central longitudinal axis 61 of the snowmobile 30, at two points 116 and 118. These two points 116, 118 define the lower A-arm swing axis 120 (FIGS. 3 and 4). The proximal ends of the upper A-arm 108 are rotatably connected to the upper portion of the front portion 98 of frame 36 at two points 122 and 124. These two points 122, 124 define the upper A-arm swing axis 125 (FIGS. 3 and 4). As illustrated, the upper A-arm 108 includes a reinforcement segment 123 joining both sides of the upper A-arm 108 to increase the rigidity of the upper A-arm 108. Each A-arm typically includes a front bar and a rear bar. The front and rear bars are joined and fixed together at their distal ends which is rotatably connected to the spindle. The proximal ends of the front and rear bars are spaced apart thus forming a roughly triangular, "V" or "A" shape. Each A-arm has therefore two mounting points on the frame and one joint on the spindle. The broad end of the "A" attaches to the frame and the narrow end attaches to the spindle. "A-arm" is the term commonly used to designate a suspension arm having a roughly triangular, "V" or "A" shape. As those skilled in the art would be aware, the A-arm may not be "A" shaped but rather "V" shaped or generally triangular. The double A-arm suspension is also often referred to as a "double wishbone suspension" in reference to the generally "V" shaped chicken bone that two persons pull apart while making a wish.

In a different embodiment, the broad end of the upper A-arm 108 can be joined together at their mounting points 122 and 124 to form a generally triangular A-arm. Similarly, the broad end of the lower A-arm 106 can be joined together at their mounting points 116 and 118 to form a generally triangular A-arm.

The ski 42 is connected to the lower portion of the spindle 110 via a pivot pin 128 such that the ski 42 can pivot about the axis of the pin 128 to glide along and over bumps and follow the contours of the terrain when the snowmobile is moving. The pin 128 rigidly connects the ski 42 to the spindle 110 in all other directions such that the steering motion of the spindle 110 is transferred to the ski 42 to steer the snowmobile 30. The distal end 135 of the steering rod 130 is connected to the steering arm 133 on the spindle 110 via a ball joint 132 and the proximal end 131 of the steering rod 130 is connected, via another ball joint 136, to a pitman arm 134 extending from the steering column 50 (FIGS. 3 and 4). The lower A-arm 106 also includes mounting brackets 142 for a spring/shock absorber assembly (not shown).

With reference to FIGS. 3 and 4, the two mounting points 116 and 118 of the lower A-arm 106 define the lower A-arm swing axis 120 and the two mounting points 122 and 124 of the upper A-arm 108 define the upper A-arm swing axis 125. The steering rod 130 is directly connected at its proximal end 131 via another ball joint 136 to the pitman arm 134, which extends from the lower portion of the steering column 50. The steering column 50 is supported onto the frame 98 by bearing bushings 138 which provides freedom of rotation to the steering column 50, and to the pitman arm 134, for steering the skis.

The left and right lower A-arms 106 are connected together via an anti-roll bar 140 (also known as a stabilizer bar or a sway bar) that acts as a torsion bar, which connects the right side suspension 102 to the left side suspension 104. The anti-roll bar 140 reduces body-roll tendency by transferring some of the movements of one side of the front the suspension to the other side of the front suspension. In the embodiment illustrated in FIG. 4, a lever arm 144 is rigidly connected to each end of the anti-roll bar 140. The end of each lever arm 144 is rotatably connected to a strut 156 that is itself rotatably connected to each lower A-arm 106. In operation, an upward movement of only one of the right side or left side front suspension 102, 104 moves the lever arm 144 upwards thereby imparting a torque to the anti-roll bar 140 which in turn transfer a portion of that torque to the other lever arm 144 thereby lifting the opposite side front suspension 102, 104. The effect of the anti-roll bar 140 to prevent excessive roll of the snowmobile 30 especially when cornering.

Figure 5:
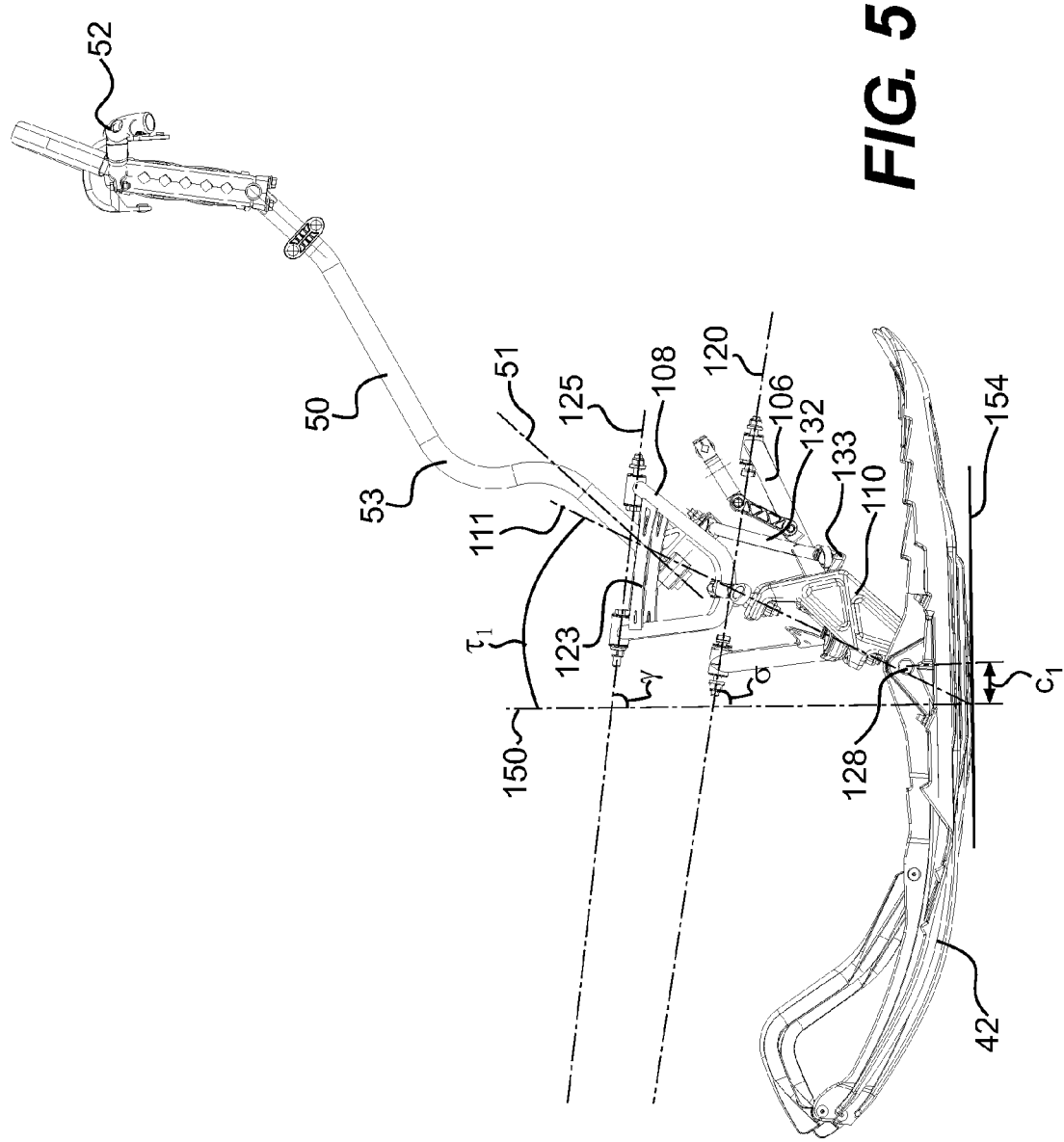
FIG. 5 is a side elevational view of the front suspension and steering assembly shown in FIGS. 3 and 4 in the fully extended position.
Figure 6:
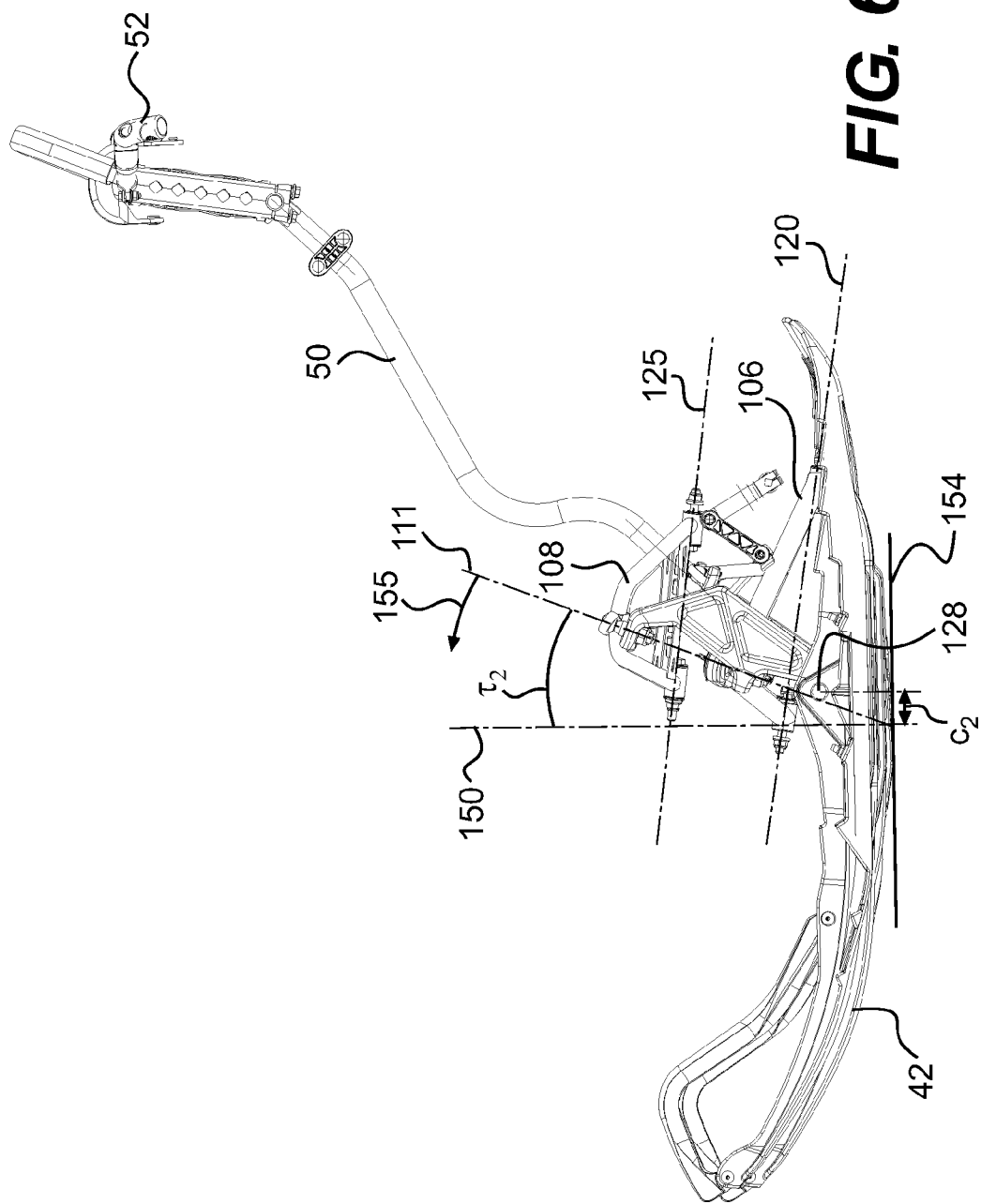
FIG. 6 is a side elevational view of the front suspension and steering assembly shown in FIG. 5 in the fully compressed position.

FIGS. 5 and 6 illustrate the left side 104 of the front suspension 100 in its two extreme positions: fully extended such as when the front end of the snowmobile 30 is in the air after a jump (FIG. 5) and fully compressed such as when the snowmobile 30 hits a large bump or is landing nose heavy (FIG. 6). With reference to FIG. 5, the upper A-arm swing axis 125 and the lower A-arm swing axis 120 are not parallel when viewed from the side. The upper A-arm swing axis 125 makes an angle γ with a vertical plane 150, which is a plane perpendicular to the ground 154 and to the longitudinal axis 61 of the snowmobile 30 (FIG. 1), whereas the lower A-arm swing axis 120 makes an angle u with the same vertical plane 150. The angle γ is greater than angle σ (γ>σ) such that the extensions of the upper A-arm swing axis 125 and of the lower A-arm swing axis 120 cross each other somewhere in front of the spindle 110. When the front suspension is fully extended as illustrated in FIG. 5, the caster angle τ which is defined as the angle between the steering axis 111 and the vertical plane 150 viewed from the side, has a value of τ1. This defines a positive caster offset C1. The caster offset C is the distance between a vertical line passing through pivot pin 128 and the point at which the steering axis 111 intersects the ground 154 when viewed from the side. The caster offset C determines the degree of self-centering action in the steering, influences straight running stability and more importantly influences the steering force required to turn the skis when cornering. A larger caster offset C increases stability and self-centering action in the steering but also increases the steering force required to turn the skis, whereas a small caster offset C decreases stability and self-centering action in the steering and decreases the steering force required to turn the skis. As is well known in the art of vehicle suspensions, a positive caster angle is when the steering axis is tilted rearward when viewed from the side. That is, the top pivot point 112 of the spindle 110 is positioned farther rearward than the bottom pivot point 114 of the spindle 110 (FIG. 2).

Referring now to FIG. 6, this figure illustrates the left side 104 of the front suspension 100 fully compressed. Comparing the fully extended position illustrated in FIG. 5, with the fully compressed position illustrated in FIG. 6, one can see that the steering axis 111 has tilted forward as depicted by arrow 155 such that the caster angle τ has decreased to a value of $\tau_2$ (i.e. $\tau_2 < \tau_1$) and consequently, the caster offset C has been reduced to the value C2 (i.e. C2<C1). The front suspension 100 has at least 8 inches of vertical travel (i.e. vertical distance between fully extended and fully compressed) and preferably between 8 and 12 inches, which accounts for a substantial variation in the caster angle τ and the caster offset C. In the illustrated embodiment, the caster angle τ has a 3°-7° variation through the vertical travel of the front suspension 100. In the illustrated embodiment of FIG. 5, the caster angle $\tau_1$ has a value of 23° which decreases to a caster angle $\tau_2$ of 18° giving a variation of 5°. In another embodiment, the caster angle $\tau_1$ (fully extended) can have a value of 25° which decreases to a caster angle $\tau_2$ (fully compressed) of 18° giving a variation of 7°. In yet another embodiment, the caster angle $\tau_1$ (fully extended) can have a value of 22° which decreases to a caster angle $\tau_2$ (fully compressed) of 19° giving a variation of 3°. In yet another embodiment, the caster angle $\tau_1$ (fully extended) can have a value of 20° which decreases to a caster angle $\tau_2$ (fully compressed) of 16° giving a variation of 4°. The caster angle τ relative to the vertical plane 150 preferably varies between 16° and 25°. The caster angle τ variations may differ substantially depending on the initial caster angle τ and the difference between the angle γ of the upper A-arm swing axis 125 and the angle σ of the lower A-arm swing axis 120. The geometry of the front suspension 100 defines a variable caster angle as the front suspension 100 travels up and down. More specifically, the front suspension 100 defines a decreasing caster (caster angle τ and caster offset C) as the front suspension 100 is compressed.

The practical effect of this is as follows. As the front suspension 100 compresses under additional load (weight) applied to the front of the snowmobile 30, the steering effort required to turn the skis increases because the skis are pushed into the snow making them more difficult to turn. With the front suspension 100 having a decreasing caster angle as the suspension compresses, the increasing steering effort required to turn the skis under additional load is partially offset or reduced by the decreasing caster offset C. A resultant steering effort is, at the very least, less than it would have been if the caster angle had remained constant or increased as the front suspension 100 is compressed. In effect, the front suspension 100 having a decreasing caster angle improves the steering of the snowmobile 30 when the front suspension 100 is compressed.

Another positive effect of the decreasing caster occurs when the front suspension 100 is compressed over uneven terrain. In these situations, the skis move backward under load as the caster angle and the caster offset decrease, thus partially absorbing the impacts, relieving some of the stresses on the suspension components and reducing the impacts transferred to the passenger. The dynamics of the decreasing caster is complementary to the action of the front suspension in absorbing shocks.

Figure 7:
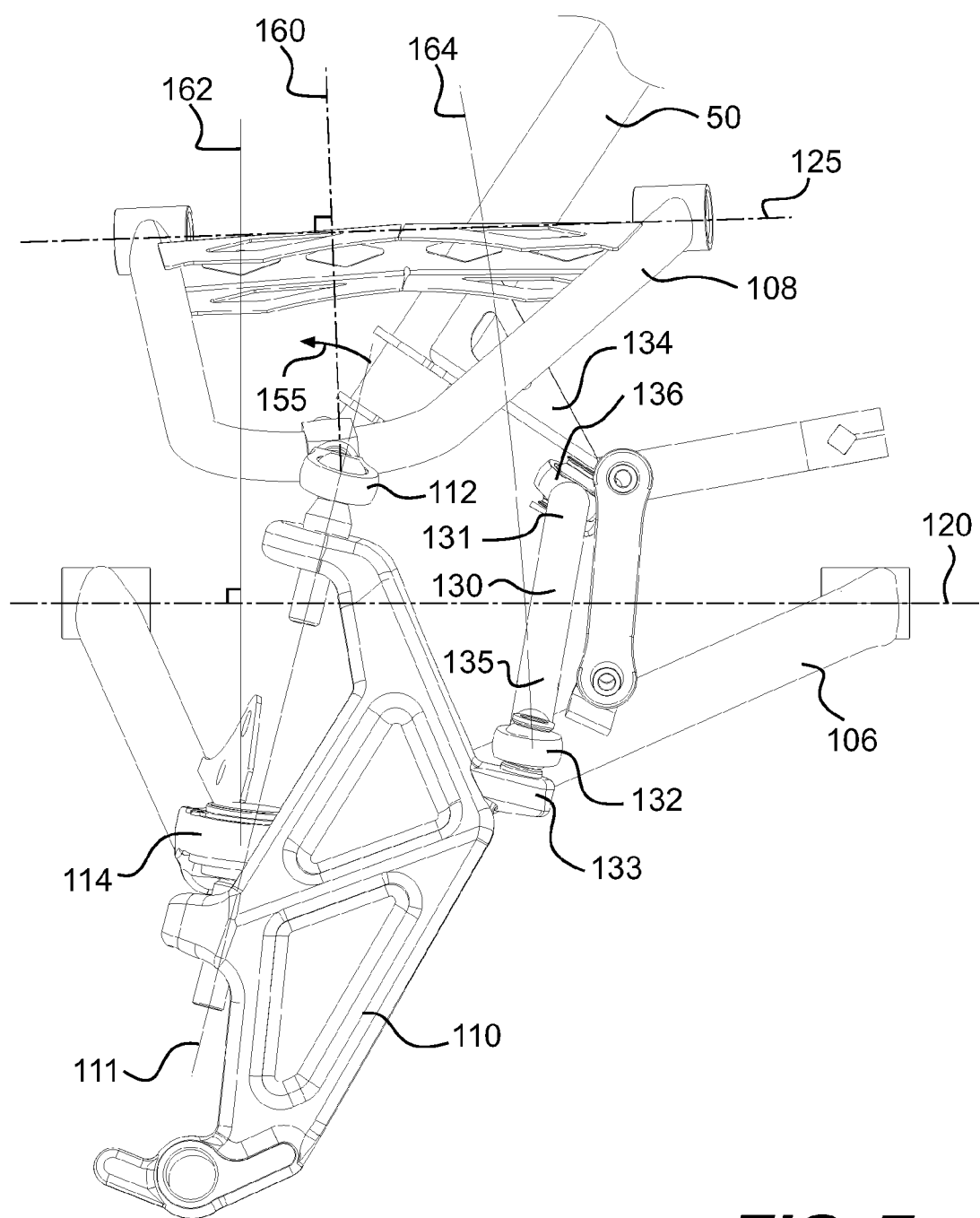
FIG. 7 is a partial side elevational view of the front suspension and steering assembly showing the trajectories of the various connection points.

With reference to FIG. 7, as previously mentioned, the upper A-arm swing axis 125 and the lower A-arm swing axis 120 are not parallel to each other, when viewed from the side, and cross each other somewhere in front of the spindle 110. The projection of the path of motion 160 of the upper ball joint 112 connected to the upper portion of the spindle 110 onto a vertical plane parallel to the longitudinal axis 61 of the snowmobile 30, and the projection of the path of motion 162 of the second ball joint 114 connected to the middle portion of the spindle 110 onto the same vertical plane, are perpendicular to their corresponding swing axes 120 and 125. As a result, the projection of the paths of motion 160 and 162 are also non-parallel. The projection of the path of motion 160 is more tilted towards the front of the snowmobile 30 than the projection of the path of motion 162, such that the extensions of the two paths of motion 160 and 162, viewed form the side, cross each other somewhere above the snowmobile 30. Because the two paths of motion 160 and 162 are inclined such that their extensions cross above the snowmobile 30, the steering axis 111 tilts forward as the upper A-arm 108 and the lower A-arm 106 move upward during compression of the front suspension 100 as indicated by arrow 155, and the caster angle τ decreases. The decreasing caster angle causes the steering arm 133 to follow a slightly curvilinear path of motion 164 as viewed from the side or projected onto the vertical plane because of the caster angle τ decreases. The curvilinear path of motion 164 has a center of curvature located in front of the ball joint 132, in front of the snowmobile 30.

Referring back to FIG. 4, the steering rods 130 are connected at their proximal ends 131 to the pitman arm 134, which extend substantially perpendicular to the steering column 50, via ball joints 136. The lower portion of the steering column 50 is therefore pivotally connected to the proximal ends 131 of the steering rods 130 such that the proximal ends 131 rotate about the steering column axis 51. The distal ends 135 of the steering rods 130 are pivotally connected to the steering arms 133 of the spindles 110 and therefore rotate about the steering axis 111. The pitman arm 134 couples the steering arm 133 of each spindle 110 to the steering column 50 via a single steering rod 130. In operation, when the handlebars 52 are turned, the lower portion of the steering column 50 rotates thereby rotating the pitman arm 134, extending therefrom, about the steering column axis 51. The pitman arm 134 simultaneously pulls on the proximal end 131 of one of the steering rods 130 and pushes on the proximal end 131 of the other one of the steering rods 130 on the opposite side of the snowmobile 30. This imparts a translatory motion to the steering rods 130 which in turn pull or push (as the case may be) on the steering arm 133 of each spindle 110, imparting a rotational motion to the spindle 110 and to the ski about the steering axis 111.

In the illustrated embodiment, the pitman arm 134 is a single reinforced plate connected to the lower portion of the steering column 50. The pitman arm 134 preferably includes two balls joints 136, one for connecting each steering rod 130. In another embodiment, the pitman arm 134 could consist of separate segments each connected to the lower portion of the steering column 50 very close together and extending substantially perpendicular from the steering column 50.

Typically, double A-arm suspensions for snowmobiles having more than 8 inches of suspension travel are equipped with a double pitman arm type steering in order to obtain acceptable bump steer during compression of the front suspension 100. A double pitman arm type steering is simply a steering rack connected to the pitman arm of the steering column and to a slave pitman arm rotatably connected to the frame. The ends of the steering rack are connected to the steering rods which are connected to the steering arms of the spindles of the snowmobile. The reason for having a double pitman arm system is to shorten the lengths of the steering rods so that the proximal end of each steering rod is positioned at the center of the arc made by the steering arm on the spindle when the suspension is compressed to avoid unwanted bump steer. As is well known, bump steer occurs when the skis toe in or out when the suspension system is displaced through its travel. Bump steer is most often felt when the snowmobile traverses uneven terrain wherein the front suspension compresses and causes the skis to move out of parallel with each other. The push or pull of the steering rods on the spindles, as the suspension travels up or down, causes the skis to steer themselves without input from the steering column. Bump steer is directly related to the lengths and angles of the suspension components, to the lengths and angles of the steering linkages, and to the locations of the various pivot points. Most vehicles are designed so that the effects of bump steer are minimal.

When using a steering system comprising a single pitman arm 134 connected directly to the left and right spindles 110 of a double A-arm suspension system via steering rods 130, the length of the steering rods 130 are longer than the theoretical arc radius made by the steering arms 133 on the spindles 110 in the suspension travel. This causes an unacceptable amount of bump steer.

Figure 8:
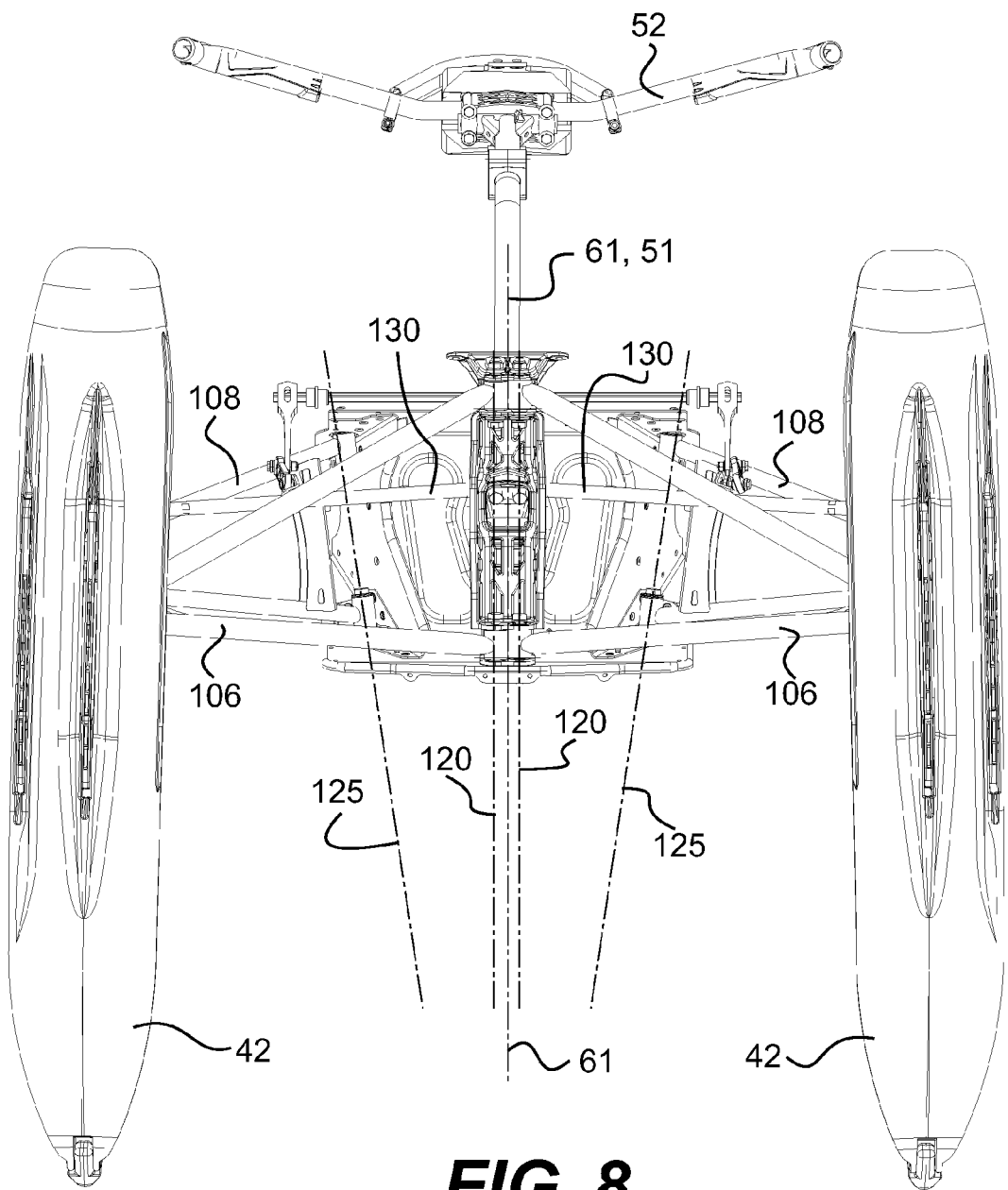
FIG. 8 is a bottom plan view of the front suspension and steering assembly shown in FIG. 2.
Figure 9:
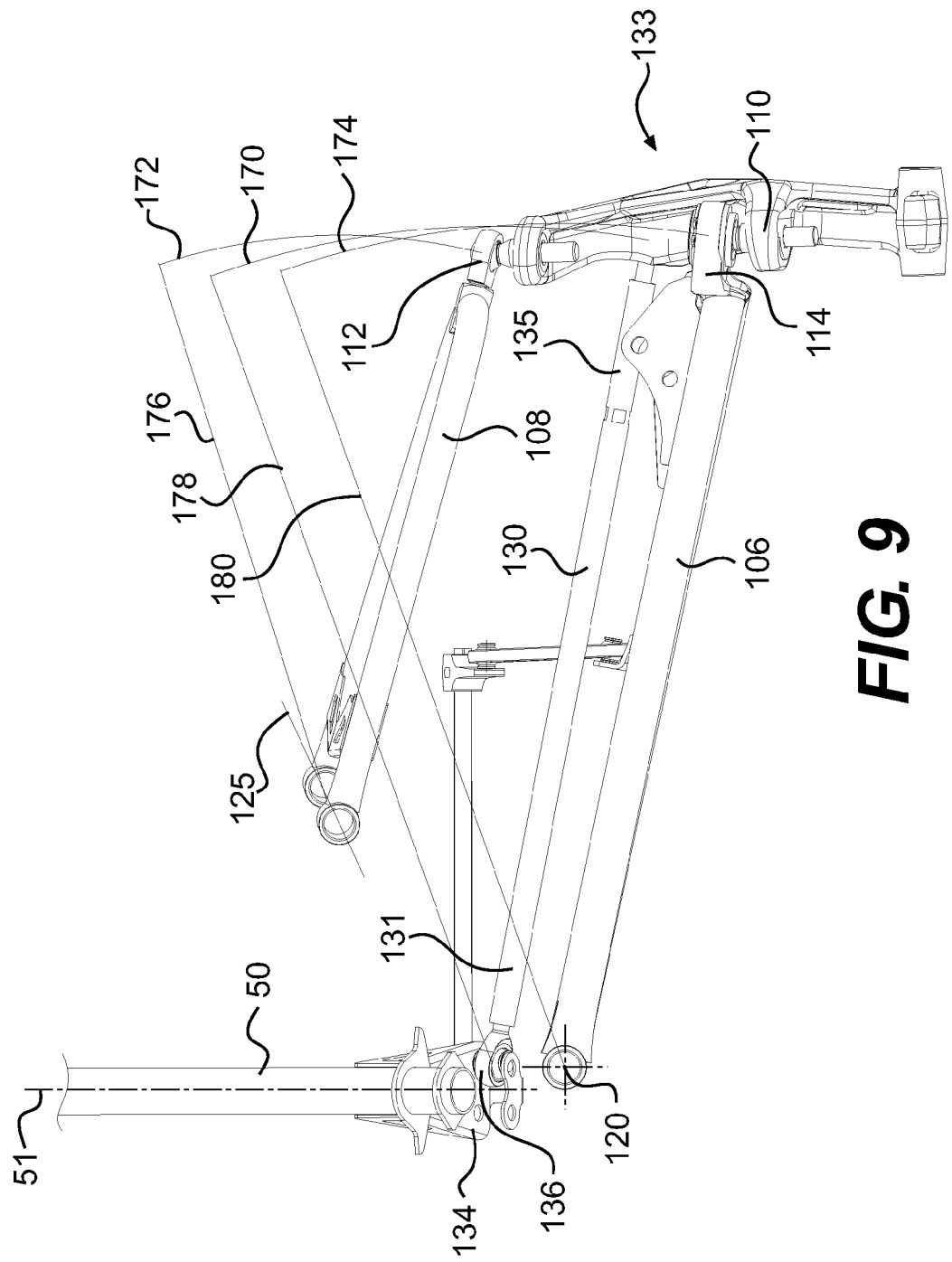
FIG. 9 is a partial front elevational view of the front suspension and steering assembly shown in FIG. 7

To reduce bump-steer and allow for a single pitman arm steering system, the upper and lower A-arms 106 and 108 are mounted to the frame 36 such that the upper and lower A-arm swing axis 120 and 125 are non-parallel when view from the side (in the vertical plane) as shown in FIG. 5 and also non-parallel when view from below (in the horizontal plane) as shown in FIG. 8. It was found that by offsetting the upper A-arm swing axis 125 relative to the lower A-arm axis 120 in both the horizontal and vertical planes, the theoretical center of the arc of the steering arm 133 of the spindle 110 could be varied so that the center falls close to the central longitudinal axis of the snowmobile 30 and therefore close to the ball joint 136 connecting the steering rod 133 to the pitman arm 134 (FIG. 9). By slanting the upper A-arm swing axis 125 downward so that it crosses with lower A-arm swing axis 120 at the front of the snowmobile 30 as shown in FIG. 5, and by also pivoting the upper A-arm swing axis 125 inward so that the left and right upper A-arm swing axes 125 cross each other in front of the snowmobile 30 as shown in FIG. 8, the center of the arc of the steering arm 133 of the spindle 110 is brought very close to the central longitudinal axis 61 of the snowmobile 30. Therefore, the proximal ends 131 of the steering rods 130 when attached to the single pitman arm 134, are very near the center of the arc made by the steering arm 133 of the spindle 110 when the suspension 100 is compressed such that bump steer is reduced to acceptable level during compression of the suspension 100. In effect, the distal end 135 of the steering rod 130, or the connection point of the steering arm 133 to the distal end 135 of the steering rod 130, follows an arc radius having a center positioned generally about a longitudinal and vertically extending centerplane of the snowmobile which is defined by the steering axis 51 and the central longitudinal axis 61.

With reference to FIG. 9, the arc 170 of the steering arm 133 of the spindle 110 is defined by arcs 172 and 174 of the upper A-arm 108 and of the lower A-arm 106 respectively. As shown in FIG. 9, the arc radius 176 of the upper A-arm 108 is shorter than the arc radius 180 of the lower A-arm 106, whereas the arc radius 178 of the steering arm 133 is equal to or slightly shorter than the arc radius 180 of the lower A-arm 106. The positioning of the steering arm 133 near the height of the ball joint 114 of the lower A-arm 106 such that the lower A-arm 106 and the steering rod 130 are substantially parallel to each other, combined with an upper A-arm swing axis 125 angled inwardly and downwardly relative to the lower A-arm swing axis 120, brings the center of the arc 170 of the steering arm 133 to nearly coincide with the ball joint 136 of the pitman arm 134 throughout the travel of the front suspension 100. Thus, the bump steer of the entire front suspension 100 is brought to an acceptable level. In the illustrated embodiment of the front suspension 100, the length of the steering rod 130 is equal to or less than the length of the lower A-arm 106. Experimentally, the upper A-arm 108, the lower A-arm 106 and the steering rod 130 maintain bump steer at +/−1° for the entire travel of the front suspension 100.

The present front suspension 100 and the steering rods 130 are connected to the spindles 110 via ball joints such that the decreasing caster can be implemented in combination with a single pitman arm system that does not generate undue bump-steer when the suspension is compressed.

A single pitman arm system as described above includes a single pitman arm 134, which extends from the steering column 50, and is connected directly to the proximal ends 131 of the steering rods 130, which are connected directly to the steering arm 133 of the spindles 110. This arrangement eliminates many of the components typically used in a double pitman arm type steering system, and thus reduces the cost and weight of the snowmobile 30, as well as frees up space for other components.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A snowmobile comprising:
   a frame having a front portion and a rear portion;
   a drive track disposed below and supporting the rear portion of the frame;
   an engine mounted on the frame;
   a drive train operatively interconnecting the engine with the drive track for delivering propulsive power to the drive track;

a front suspension having a left side and a right side, each side of the front suspension having an upper A-arm, a lower A-arm, and a spindle, connecting points of the upper A-arm and lower A-arm to the spindle defining a caster angle with respect to vertical, the upper A-arm and the lower A-arm being connected to the front portion of the frame such that the caster angle decreases when the front suspension is compressed;

two skis connected to the front suspension system, one ski being connected to each spindle; and a steering assembly mounted on the frame and operatively connected to each spindle via steering rods for steering the skis.

2. A snowmobile as defined in claim 1, wherein, for each side of the front suspension, the connection of the upper A-arm to the front portion of the frame defines an upper A-arm swing axis and the connection of the lower A-arm to the front portion of the frame defines a lower A-arm swing axis, the upper A-arm swing axis being non-parallel to the lower A-arm swing axis and crossing the lower A-arm swing axis forward of the spindle.

3. A snowmobile as defined in claim 2, wherein the upper A-arm swing axes of each side of the front suspension are non-parallel to each other and cross each other forward of the front of the front suspension.

4. A snowmobile as defined in claim 1, wherein, for each side of the front suspension, the lower A-arm is longer than the upper A-arm.

5. A snowmobile as defined in claim 1, wherein the steering assembly includes a steering column having a pitman arm connected directly to each spindle via the steering rods.

6. A snowmobile as defined in claim 5, wherein, for each side of the front suspension, a length of the steering rod is at most equal to a length of the lower A-arm and is longer than a length of the upper A-arm.

7. A snowmobile as defined in claim 1, wherein the caster angle has a variation ranging from 3° to 7°.

8. A snowmobile as defined in claim 7, wherein the caster angle varies from 16° to 25° relative to the vertical.

9. A snowmobile comprising:
a frame having a front portion and a rear portion;
a drive track disposed below and supporting the rear portion of the frame;
an engine mounted on the frame;
a drive train operatively interconnecting the engine with the drive track for delivering propulsive power to the drive track;
a double A-arm front suspension having a left side and a right side; and
two skis connected to the double A-arm front suspension system, one ski to each left side and right side,
each side of the front suspension having:
an upper A-arm;
a lower A-arm, each A-arm having a proximal end and a distal end, the distal ends defining arc radii during movement of the suspension, the arc radius of the lower A-arm being greater than the arc radius of the upper A-arm;
a steering rod having a distal end and a proximal end; and
a spindle pivotally connecting the ski to the distal ends of the upper A-arm and the lower A-arm, the spindle being pivotally connected to the steering rod at the distal end thereof such that during movement of the suspension the distal end of the steering rod follows an arc radius having a center positioned generally about a longitudinal and vertically extending centerplane of the snowmobile, the arc radius of the steering rod being greater than the arc radius of the upper A-arm, and being equal to or less than the arc radius of the lower A-arm, the connections of the upper A-arm and lower A-arm to the spindle defining a steering axis, the upper A-arm and the lower A-arm of each side of the front suspension being connected to the front portion of the frame such that a caster angle of the steering axis decreases when the front suspension is compressed, the caster angle being measured from vertical.

10. A snowmobile as defined in claim 9, wherein the connection of the upper A-arm to the front portion of the frame defines an upper A-arm swing axis and the connection of the lower A-arm to the front portion of the frame defines a lower A-arm swing axis, the upper A-arm swing axis being non-parallel to the lower A-arm swing axis and crossing with the lower A-arm swing axis in front of the suspension.

11. A snowmobile as defined in claim 9, wherein the connection of the upper A-arm to the front portion of the frame defines an upper A-arm swing axis and the connection of the lower A-arm to the front portion of the frame defines a lower A-arm swing axis, the upper A-arm swing axis of the left and right sides of the front suspension being non-parallel to each other and crossing each other in front of the suspension.

12. A snowmobile as defined in claim 9, wherein the steering rods are directly connected to the pitman arm via ball joints.

13. A snowmobile as defined in claim 9, wherein the lower A-arm and the steering rod are substantially parallel to each other.

14. The snowmobile of claim 9, wherein a proximal end of the steering rod is disposed laterally between the longitudinal and vertically extending centerplane of the snowmobile and a straight line passing through a mounting point of a front bar of the upper A-arm and a mounting point of a front bar of the lower A-arm.

15. A snowmobile comprising:
a frame having a front portion and a rear portion;
a drive track disposed below and supporting the rear portion of the frame;
an engine mounted on the frame;
a drive train operatively interconnecting the engine with the drive track for delivering propulsive power to the drive track; and
a front suspension having a left side and a right side, each side of the front suspension having an upper A-arm, a lower A-arm, and a spindle, connecting points of the upper A-arm and lower A-arm to the spindle defining a steering axis, the steering axis defining a positive caster angle with respect to vertical;
wherein the suspension has an uncompressed state and a compressed state and the caster angle in the compressed state is smaller than the caster angle in the uncompressed state.

16. A snowmobile as defined in claim 15, wherein each connection between the upper and lower A-arms and the spindle is a multiple axis connection.

17. A snowmobile as defined in claim 16, wherein the multiple axis connections are ball joints.

18. A snowmobile as defined in claim 16, wherein the upper A-arm swing axes of the left and right side of the front suspension are non-parallel to each other and cross each other in front of the spindles.

19. A snowmobile as defined in claim 15, wherein the connection of the upper A-arm of each left and right side of the front suspension to the front portion of the frame defines a left and right upper A-arm swing axis and the connection of the lower A-arm of each left and right side of the front suspension to the front portion of the frame defines a left and right lower A-arm swing axis, the upper A-arm swing axis of each left and right side of the front suspension being non-parallel to its corresponding lower A-arm swing axis and crossing with the corresponding lower A-arm swing axis in front of the spindle.

20. A snowmobile as defined in claim 19, wherein the caster angle varies from 16° to 25° relative to the vertical.

21. A snowmobile as defined in claim 15, wherein the caster angle has a variation ranging from 3° to 7°.

* * * * *